US009870398B1

(12) United States Patent
Kim et al.

(10) Patent No.: US 9,870,398 B1
(45) Date of Patent: Jan. 16, 2018

(54) DATABASE-TABLE SAMPLING-PERCENTAGE SELECTION

(71) Applicant: Teradata US, Inc, Dayton, OH (US)

(72) Inventors: Sung Jin Kim, Buena Park, CA (US); Rama Krishna Korlapati, El Segundo, CA (US)

(73) Assignee: Teradata US, Inc., Dayton, OH (US)

( * ) Notice: Subject to any disclaimer, the term of this patent is extended or adjusted under 35 U.S.C. 154(b) by 711 days.

(21) Appl. No.: 13/936,840

(22) Filed: Jul. 8, 2013

Related U.S. Application Data

(60) Provisional application No. 61/747,671, filed on Dec. 31, 2012.

(51) Int. Cl.
*G06F 17/30* (2006.01)

(52) U.S. Cl.
CPC ............. *G06F 17/30469* (2013.01)

(58) Field of Classification Search
CPC ............................................. G06F 17/30469
USPC ........................................................ 707/718
See application file for complete search history.

(56) References Cited

U.S. PATENT DOCUMENTS

| | | | | |
|---|---|---|---|---|
| 4,956,774 A * | 9/1990 | Shibamiya | ........ | G06F 17/30474 |
| 6,363,371 B1 * | 3/2002 | Chaudhuri | ........ | G06F 17/30463 |
| 6,529,901 B1 * | 3/2003 | Chaudhuri | ........ | G06F 17/30463 |
| 6,691,099 B1 * | 2/2004 | Mozes | ............ | G06F 17/30306 |
| 6,732,085 B1 * | 5/2004 | Mozes | ............ | G06F 17/30536 |
| 6,801,903 B2 * | 10/2004 | Brown | ............ | G06F 17/30595 |
| 7,499,907 B2 * | 3/2009 | Brown | ............ | G06F 17/30336 |
| 7,676,451 B2 * | 3/2010 | Burger | ............ | G06F 17/30398 707/687 |
| 7,778,996 B2 * | 8/2010 | Burger | ............ | G06F 17/30536 707/713 |
| 7,962,521 B2 * | 6/2011 | Brown | ............ | G06F 17/30336 707/601 |
| 9,141,664 B2 * | 9/2015 | Mitchell | ........ | G06F 17/30404 |
| 2003/0088546 A1 * | 5/2003 | Brown | ........ | G06Q 10/10 |

(Continued)

OTHER PUBLICATIONS

Chaudhuri, Surajit, et al., "Automating Statistics Management for Query Optimizers", IEEE Transactions on Knowledge Engineering, vol. 13, No. 1, Jan./Feb. 2001, pp. 7-20.*

(Continued)

*Primary Examiner* — Robert Stevens
(74) *Attorney, Agent, or Firm* — Randy L. Campbell, Jr.

(57) ABSTRACT

A database system may include a storage device configured to store a plurality of database tables. The database system may further include a processor in communication with the storage device. The processor may determine a first sampling percentage to be used on a column of a database table. The first sampling percentage may be based on a respective frequency of each column value in the column. The processor may determine a second sampling percentage to be used on the column in generation of the plan to respond to the database query. The second sampling percentage may be based on size of the database table. The processor may select the maximum of the first sampling percentage and the second sampling percentage. The selected sampling percentage may be used to collect statistics on the column. The collected statistics may be used to generate at least one database query response plan associated with the column. A method and computer-readable medium may also be implemented.

20 Claims, 6 Drawing Sheets

(56) References Cited

U.S. PATENT DOCUMENTS

| | | | |
|---|---|---|---|
| 2003/0088579 A1* | 5/2003 | Brown | G06F 17/30595 |
| 2003/0093408 A1* | 5/2003 | Brown | G06F 17/30336 |
| 2003/0167275 A1* | 9/2003 | Rjaibi | G06F 17/30536 |
| 2004/0059743 A1* | 3/2004 | Burger | G06F 17/30536 |
| 2004/0193629 A1* | 9/2004 | Mozes | G06F 17/30536 |
| 2004/0225639 A1* | 11/2004 | Jakobsson | G06F 17/30463 |
| 2008/0172354 A1* | 7/2008 | Zuzarte | G06F 17/30469 |
| 2008/0222093 A1* | 9/2008 | Fan | G06F 17/30469 |
| 2008/0263001 A1* | 10/2008 | Lohman | G06F 17/30445 |
| 2008/0275840 A1* | 11/2008 | Burger | G06F 17/30398 |
| 2009/0083215 A1* | 3/2009 | Burger | G06F 17/30536 |
| 2010/0057796 A1* | 3/2010 | Brown | G06F 17/30336 707/715 |
| 2010/0106708 A1* | 4/2010 | Burger | G06F 17/30474 707/713 |
| 2010/0281016 A1* | 11/2010 | Weissman | G06F 17/30442 707/716 |
| 2010/0306188 A1* | 12/2010 | Cunningham | G06F 17/30463 707/713 |
| 2012/0330926 A1* | 12/2012 | Rajan | G06F 17/30463 707/718 |

OTHER PUBLICATIONS

Haas, Peter J., et al., "Sampling-Based Estimation of the Number of Distinct Values of an Attribute", Proc. of the 21st VLDB Conf., Zurich, Switzerland, © 1995, pp. 311-322.*

Valentin, Gary, et al., "DB2 Advisor: An Optimizer Smart Enough to Recommend Its Own Indexes", ICDE '00, IEEE Computer Society, © 2000, 10 pages.*

Watanabe, Osamu, "Simple Sampling Techniques for Discovery Science", IEICE Trans. Inf. & Syst., vol. E83-D, No. 1, Jan. 2000, pp. 19-26.*

Ling, Yibei, et al., "An Evaluation of Sampling-Based Size Estimation Methods for Selections in Database Systems", ICDE 1995, Taipei, Taiwan, Mar. 6-10, 1995, pp. 532-539.*

Random House Webster's College Dictionary, Random House, Inc., New York, NY, © 2000, pp. 257 and 1281.*

Babcock, Brian, et al., "Dynamic Sample Selection for Approximate Query Processing", SIGMOD 2003, Jun. 9-12, 2003, San Diego, CA, pp. 539-550.*

* cited by examiner

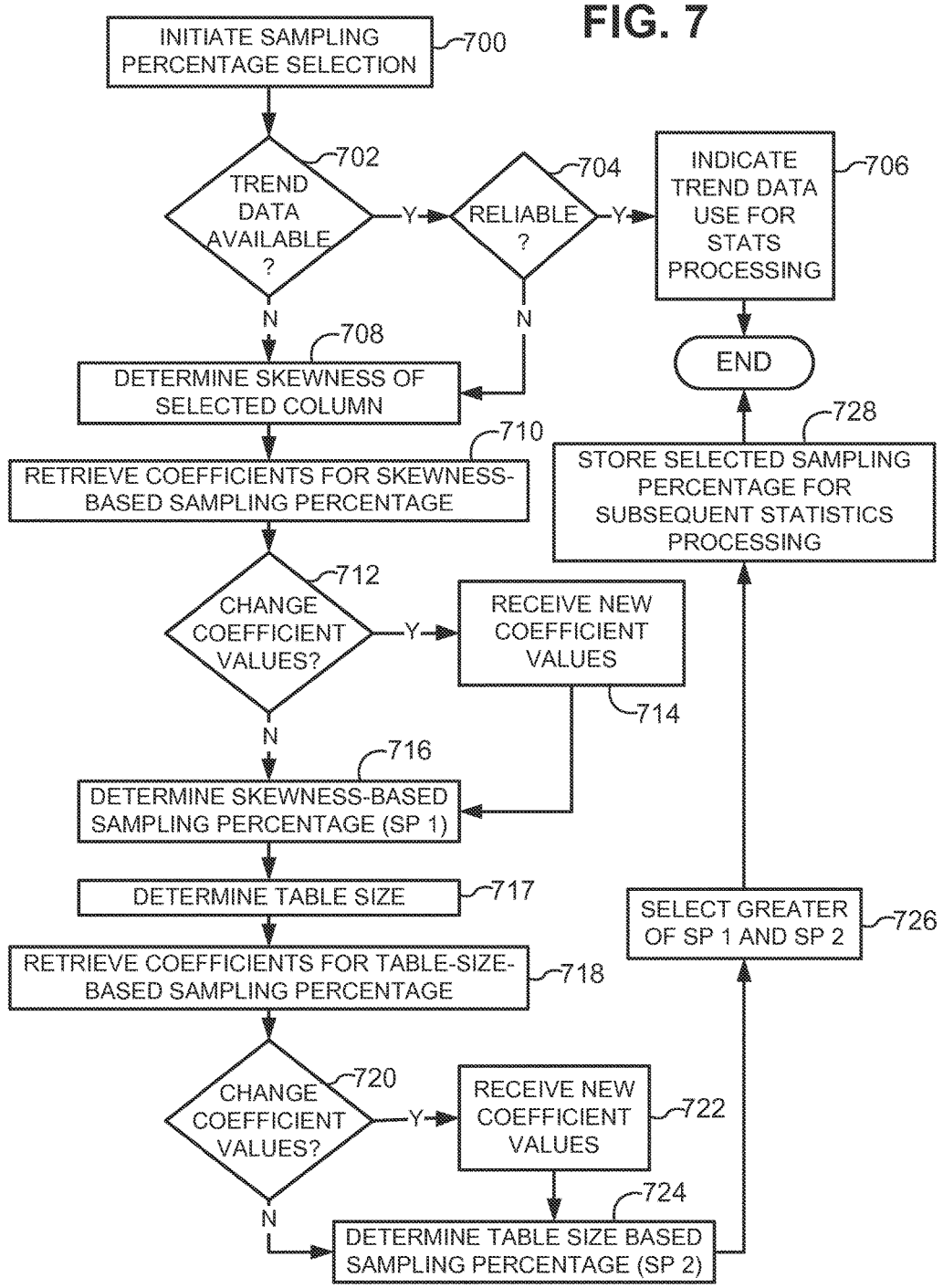

DATABASE-TABLE SAMPLING-PERCENTAGE SELECTION

CLAIM OF PRIORITY

This application claims the benefit of priority under 35 U.S.C. § 119(e) of U.S. Provisional Patent Application Ser. No. 61/747,671 filed on Dec. 31, 2012, which is hereby incorporated by reference herein in its entirety.

BACKGROUND

1. Technical Field

The present disclosure relates generally to statistical analyses for database query response plans, and more particularly to, selection of database table sampling percentages used in the statistical analyses.

2. Related Art

A database is a collection of stored data that is logically related and that is accessible by one or more users or applications. A popular type of database is the relational database management system (RDBMS), which includes relational tables, also referred to as relations, made up of rows and columns (also referred to as tuples and attributes). Each row represents an occurrence of an entity defined by a table, with an entity being a person, place, thing, or other object about which the table contains information.

Database systems may determine various response plans to a database query and select the optimal plan from among these. These plans typically depend on statistics regarding column values of columns of database tables containing data to be used in response to a database query. These statistics may become stale as new values are inserted and existing values are updated and deleted. Keeping the statistics up-to-date is important because the stale statistics could mislead the database system to choose non-optimal plans. However, collecting statistics on large tables is often prohibitively expensive. This is because a database management system should scan an entire table to look up the values of the column on which the statistics are collected. Because this is overly burdensome, many database management systems provide users with an option to specify a sampling percentage and estimate the current statistics from the sampled rows. In this sampling approach, the problem is that many database administrators have a difficulty with determining appropriate sampling percentages for a target column.

SUMMARY

In one aspect of the present disclosure, a database system may include a storage device configured to store a plurality of database tables. The database system may further include a processor in communication with the storage device. The processor may determine a first sampling percentage to be used on a column of a database table. The first sampling percentage may be based on a respective frequency of each column value in the column. The processor may determine a second sampling percentage to be used on the column in generation of the plan to respond to the database query. The second sampling percentage may be based on size of the database table. The processor may select a sampling percentage that is a maximum of the first sampling percentage and the second sampling percentage. The selected sampling percentage may be used to determine database query response plans associated with the column.

According to another aspect of the present disclosure, a method may include determining a first sampling percentage to be used on a column of a database table in generation of a plan to respond to a database query. The first sampling percentage may be based on at least one characteristic of the column. The method may further include determining a second sampling percentage to be used on the column in generation of the plan to respond to the database query. The second sampling percentage may be based on at least one characteristic of the database table. The method may further include selecting a sampling percentage that is a maximum of the first sampling percentage and the second sampling percentage. The selected sampling percentage may be used in generation of the plan to respond to the database query.

According to another aspect of the present disclosure, computer-readable medium may be encoded with a plurality of instructions executable by a processor. The plurality of instructions may include instructions to determine a first sampling percentage to be used on a column of a database table in generation of a plan to respond to a database query. The first sampling percentage may be based on at least one characteristic of the column. The instructions may further include instructions to determine a second sampling percentage to be used on the column in generation of the plan to respond to the database query. The second sampling percentage may be based on at least one characteristic of the database table. The instructions may further include instructions to select a sampling percentage that is a maximum of the first sampling percentage and the second sampling percentage. The selected sampling percentage may be used in generation of the plan to respond to the database query.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 7 is an operational flow diagram of example operation of a database system.

DETAILED DESCRIPTION OF THE FIGURES

Figure 1:
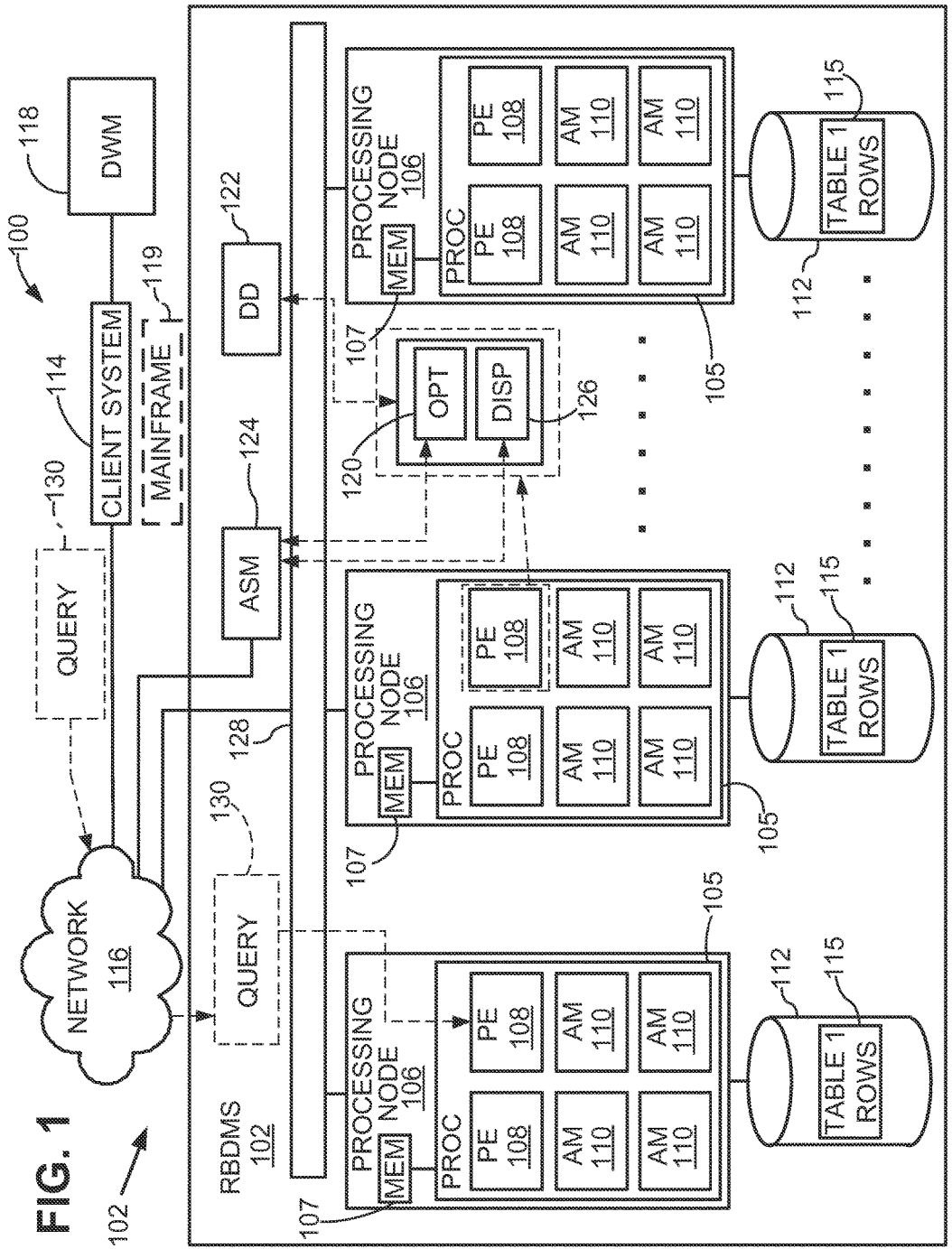
FIG. 1 is a block diagram of an example database system.

FIG. 1 is a diagrammatic representation of example architecture for a database system 100, such as a Teradata Active Data Warehousing System®. In one example, the database system 100 includes a relational database management system (RDBMS) 102 that implements a parallel-processing environment to carry out database management. The RDBMS 102 may be a combination of software (e.g., computer program routines, subroutines, applications, etc.)

and hardware (e.g., processors, memory, etc.). In the example of FIG. 1, the RBDMS 102 may be a massive parallel processing (MPP) system having an array of processing units and distributed memory. In alternative examples, the RBDMS 102 may implement a single processing unit, such as in a symmetric multiprocessing (SMP) system configuration. The RBDMS 102 may include one or more processing units used to manage the storage, retrieval, and manipulation of data in data storage facilities (DSFs) 112. The array of processing units may include an array of processing nodes 106 that manage the storage, retrieval, and manipulation of data included in a database.

In one example, each processing node 106 may include one or more physical processors 105 and memory 107. The memory 107 may include one or more memories and may be computer-readable storage media or memories, such as a cache, buffer, RAM, removable media, hard drive, flash drive or other computer-readable storage media. Computer-readable storage media may include various types of volatile and nonvolatile storage media. Various processing techniques may be implemented by the processors 105 such as multiprocessing, multitasking, parallel processing and the like, for example.

The processing nodes 106 may include one or more other processing unit arrays such as parsing engine (PE) modules 108 and access modules (AM) 110. As described herein, "modules" are defined to include software, hardware or some combination thereof executable by one or more physical and/or virtual processors. Software modules may include instructions stored in the one or more memories that are executable by one or more processors. Hardware modules may include various devices, components, circuits, gates, circuit boards, and the like that are executable, directed, and/or controlled for performance by one or more processors. The access modules 110 may be access modules processors (AMPs), such as those implemented in the Teradata Active Data Warehousing System®.

The parsing engine modules 108 and the access modules 110 may each be virtual processors (vprocs) and/or physical processors. In the case of virtual processors, the parsing engine modules 108 and access modules 110 may be executed by one or more physical processors, such as those that may be included in the processing nodes 106. For example, in FIG. 1, each parsing engine module 108 and access module 110 is associated with a respective processing node 106 and may each be executed as one or more virtual processors by physical processors 107 included in the respective processing node 106.

In FIG. 1, each processing node 106 is shown as including multiple parsing engine modules 108 and access modules 110, such that there are more parsing engine modules 108 and access modules 110 than processing nodes 106. In one example, during operation, the one or more physical processors 105 included in the processing nodes 106 may execute the parsing engine modules 108 and access modules 110 by switching between the executions of the various modules at a rapid rate allowing the vprocs to substantially operate in "parallel."

The RBDMS 102 stores data in one or more tables in the DSFs 112. In one example, rows 115 of a table, "Table 1," are distributed across the DSFs 112 and in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket." The hash buckets are assigned to DSFs 112 and associated access modules 110 by a hash bucket map. The characteristics of the columns chosen for the primary index determine how evenly the rows are distributed.

Rows of each stored table may be stored across multiple DSFs 112. Each parsing engine module 108 may organize the storage of data and the distribution of table rows. The parsing engine modules 108 may also coordinate the retrieval of data from the DSFs 112 in response to queries received, such as those received from a client computer system 114 connected to the RBDMS 102 through connection with a network 116. The network 116 may be wired, wireless, or some combination thereof. The network 116 may be a virtual private network, web-based, directly-connected, or some other suitable network configuration. In one example, the client computer system 114 may run a dynamic workload manager (DWM) client 118. Alternatively, the database system 100 may include a mainframe 119 used to interact with the RBDMS 102.

Each parsing engine module 108, upon receiving an incoming database query, such as the query 130, may apply an optimizer module 120 to assess the best plan for execution of the query. An example of an optimizer module 120 is shown in FIG. 1 with regard to parsing engine module 108. Additional description of the parsing engine modules 108 is provided with regard to FIGS. 2 and 3. Selecting the optimal query-execution plan may include, among other things, identifying which of the processing nodes 106 are involved in executing the query and which database tables are involved in the query, as well as choosing which data-manipulation techniques will serve best in satisfying the conditions of the query. To this end, for each parsing engine module 108, a parser module 202 (see FIG. 2), and/or optimizer module 120 may access a data dictionary module 122, shown in FIG. 1 specifically for parsing engine module 108 for purposes of illustration.

The data dictionary module 122 may specify the organization, contents, and conventions of one or more databases, such as the names and descriptions of various tables maintained by the RBDMS 102 as well as fields of each database, for example. Further, the data dictionary module 122 may specify the type, length, and/or other various characteristics of the stored tables. The data dictionary module 122 may also maintain statistics on columns of the database tables being stored in the DSFs 112. The RBDMS 102 typically receives queries in a standard format, such as the structured query language (SQL) put forth by the American National Standards Institute (ANSI). However, other formats, such as contextual query language (CQL), data mining extensions (DMX), and multidimensional expressions (MDX), for example, may be implemented in the database system 100 separately or in conjunction with SQL. The data dictionary may be stored in the DSFs 112 or some other storage device and selectively accessed.

The RBDMS 102 may include an active system management (ASM) module 124. The ASM module 124 may be implemented as a "closed-loop" system management (CLSM) architecture capable of satisfying a set of workload-specific goals. In other words, the RBDMS 102 is a goal-oriented workload management system capable of supporting complex workloads and capable of self-adjusting to various types of workloads. The ASM module 124 may communicate with each optimizer module 120, as shown in FIG. 1, and is adapted to convey a confidence threshold parameter and associated parameters to the optimizer module 120 in communication. Further, the ASM module 124 may communicate with a dispatcher module 126 of each parsing engine module 108 (as shown in detail FIG. 1 for parsing engine module 108) to receive query execution plan costs therefrom, and to facilitate query exception monitoring and automated modifications of confidence threshold parameters in accordance with disclosed embodiments. Further, the DWM client 118 may communicate with the ASM module 124 via the network 116.

The ASM module 124 operation has four major phases: 1) assigning a set of incoming request characteristics to workload groups, assigning the workload groups to priority classes, and assigning goals (referred to as Service Level Goals or SLGs) to the workload groups; 2) monitoring the execution of the workload groups against their goals; 3) regulating (e.g., adjusting and managing) the workload flow and priorities to achieve the SLGs; and 4) correlating the results of the workload and taking action to improve performance. In accordance with disclosed embodiments, the ASM module 124 is adapted to facilitate control of the optimizer module 120 pursuit of robustness with regard to workloads or queries.

An interconnection 128 allows communication to occur within and between each processing node 106. For example, implementation of the interconnection 128 provides media within and between each processing node 106 allowing communication among the various processing units. Such communication among the processing units may include communication between parsing engine modules 108 associated with the same or different processing nodes 106, as well as communication between the parsing engine modules 108 and the access modules 110 associated with the same or different processing nodes 106. Through the interconnection 128, the access modules 110 may also communicate with one another within the same associated processing node 106 or other processing nodes 106.

The interconnection 128 may be hardware, software, or some combination thereof. In instances of at least a partial-hardware implementation the interconnection 128, the hardware may exist separately from any hardware (e.g, processors, memory, physical wires, etc.) included in the processing nodes 106 or may use hardware common to the processing nodes 106. In instances of at least a partial-software implementation of the interconnection 128, the software may be stored and executed on one or more of the memories 107 and processors 105 of the processor nodes 106 or may be stored and executed on separate memories and processors that are in communication with the processor nodes 106. In one example, interconnection 128 may include multi-channel media such that if one channel ceases to properly function, another channel may be used. Additionally or alternatively, more than one channel may also allow distributed communication to reduce the possibility of an undesired level of communication congestion among processing nodes 106.

Figure 2:
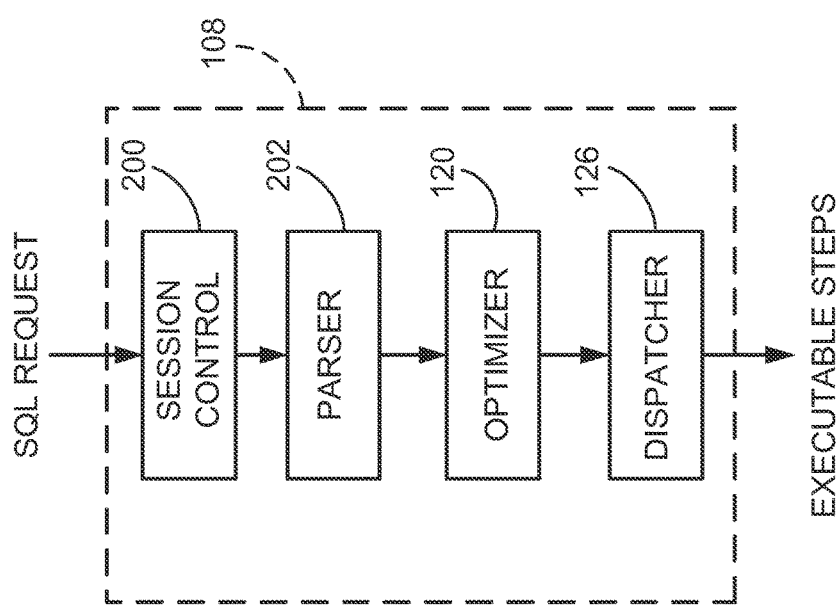
FIG. 2 is a block diagram of a portion of the example database system of FIG. 1.

In one example system, each parsing engine module 108 includes three primary components: a session control module 200, a parser module 202, and a dispatcher module 126 as shown in FIG. 2. The session control module 200 provides the logon and logoff functions. It accepts a request for authorization to access the database, verifies it, and then either allows or disallows the access. Once the session control module 200 allows a session to begin, an SQL request may be received such as through submission by a user and the SQL request is routed to the parser module 202.

Figure 3:
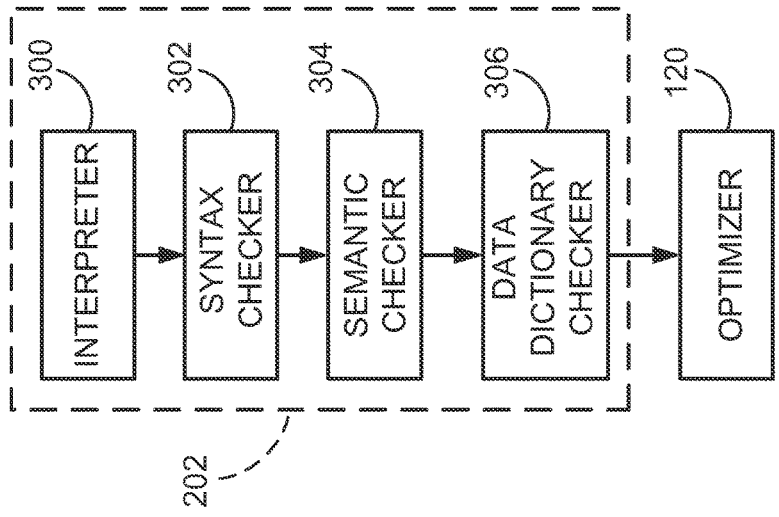
FIG. 3 is a block diagram of another portion of the example database system of FIG. 1.

As illustrated in FIG. 3, the parser module 202 may include an interpreter module 300 that interprets the SQL request. The parser module 202 may also include a syntax checker module 302 that checks the request for correct SQL syntax, as well as a semantic checker module 304 that evaluates the request semantically. The parser module 202 may additionally include a data dictionary checker 306 to ensure that all of the objects specified in the SQL request exist and that the user has the authority to perform the request. The parsing engine module 108 implements the optimizer module 120 to select the least expensive plan to perform the request, and the dispatcher 126 coordinates the runtime execution of executable steps of the query execution plan of the optimizer module 120 with the access modules 110.

In one example, to facilitate implementations of automated adaptive query execution strategies, such as the examples described herein, the ASM 124 is configured to monitor runtime exception criteria. The ASM 124 monitoring takes place by communicating with the dispatcher module 126 as it checks the query execution step responses from the access modules 110. The step responses include the actual cost information, which the dispatcher module 126 may then communicate to the ASM 124 which, in turn, compares the actual cost information with the estimated costs of the optimizer module 120.

During operation, statistics regarding one or more database tables stored in the DSFs 112 are collected. These collected statistics may be used by the optimizer module 120 to generate query plans in response to database queries. However, due to the size of database tables involved in query planning, scanning entire tables may be overly burdensome with regard to system resource usage. Thus, instead of scanning the entire tables, the tables may be sampled and the sampling may be used to estimate the statistics regarding entire tables or portions of tables, such as particular columns.

A plurality of sampling percentages may be determined, with one being selected for use based on various conditions. In one example, three sampling percentages, $p_1$, $p_2$, and $p_3$, may be determined with regard to a scan of a particular database table. One of the three percentages may be selected for use as the sampling percentage of the table through use of the following relationship:

$$p = \text{MIN}(p_3, \text{MAX}(p_1, p_2)) \qquad \text{Eqn. 1}$$

where MAX is a function that selects the greater value of the two arguments, $p_1$ and $p_2$, and MIN is a function that selects the minimum value of the two arguments $p_3$ and $\text{MAX}(p_1, p_2)$.

Figure 4:
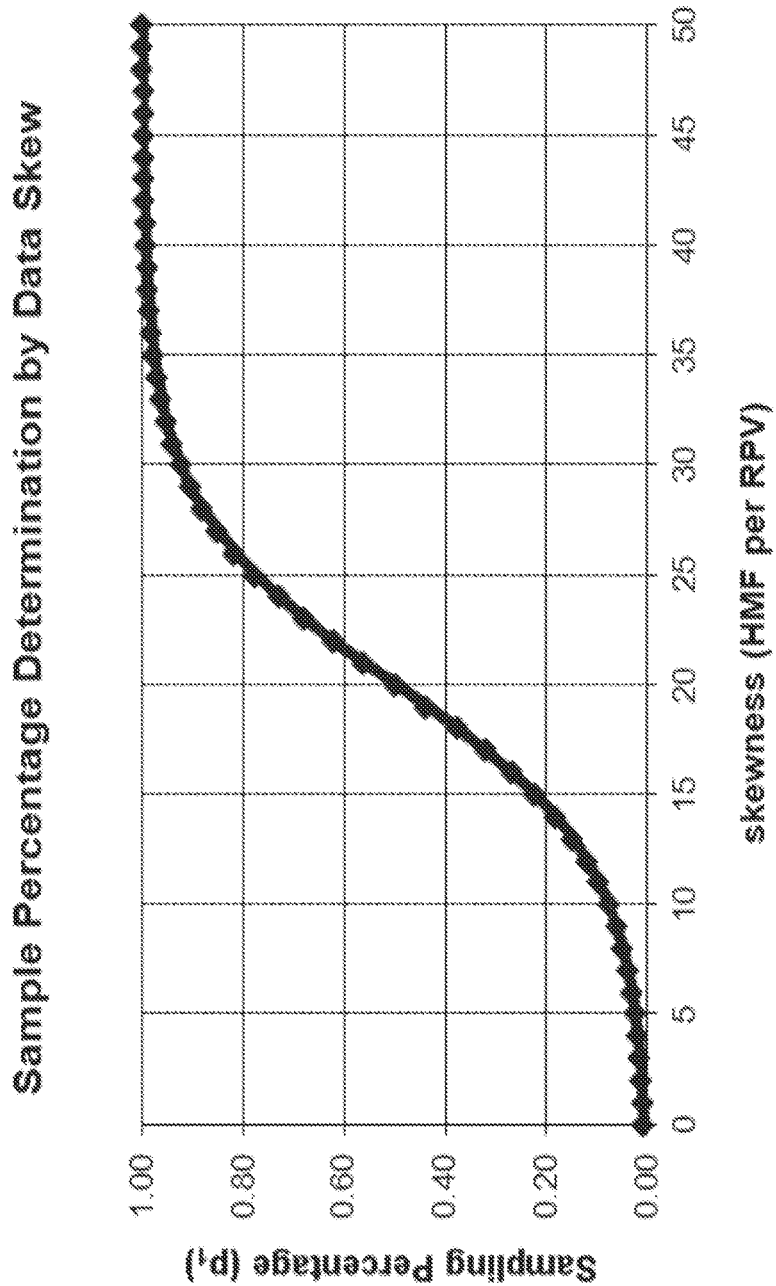
FIG. 4 is a plot of sampling percentage versus skewness.

Various factors may be considered when determining the sampling percentages. In one example, probability $p_1$ may be associated with data skew. Data skew may refer to the situation in which only a few column values of a column are very frequent relative to other column values of the same column. This situation may skew data sampling if the sampling percentage is low enough due to only a few values being sampled relative to the total amount available. This low-percentage sampling may be overly-biased towards the dominant values in a column, and thus, may inaccurately estimate the number of values. A higher sampling percentage may reduce this inaccuracy. In one example, the "skewness" of a table column may be represented as:

$$\text{skewness} = \frac{\text{High Mode Frequency } (HMF)}{\text{Rows Per Value } (RPV)} \qquad \text{Eqn. 2}$$

where the high mode frequency (HMF) is the frequency of the most frequent value of the column. The rows per value (RPV) is the average frequency of the values in the column. The sampling percentage $p_1$ may be represented as:

$$p_1 = \frac{1}{1 + e^{a1 \cdot skewness + b1}} \quad \text{Eqn. 3}$$

where a1 and b1 are coefficients. In one example, the sampling percentage $p_1$ may satisfy two properties. The first is that $p_1$ be greater than 0 and less than 1. The second is that the larger the degree of skew of a column, the greater $p_1$ should become. FIG. 4 shows a plot of $p_1$ versus skewness, where a1 is −0.25 and b1 is 5.

The sampling percentage function of Eqn. 3 may be defined to include three zones. An "aggressive" zone, "adaptive" zone, and a "conservative" zone. The aggressive zone may include the range of skewness where $p_1$ is close to zero and $p_1$ does not show a relatively substantial increase as the skewness increases. This zone in FIG. 4 may be in the 0 to 7 range of the skewness. The term "aggressive" may refer to the condition of the optimizer module 120 taking more risk of inaccurate statistics but saves more system resources when collecting the statistics.

The adaptive zone may refer to the range of skewness where $p_1$ increases relatively significantly as the skewness increases. In FIG. 4, this may be in the range of 7 to 32 of the skewness. The conservative zone is the range of skewness where $p_1$ is close to 1 and $p_1$ has relatively little change as the skewness increases. In FIG. 4, this may be in the range of 32 and greater of the skewness. The term "conservative" may refer to the optimizer taking less risk of inaccurate statistics offset by the cost of more system resource usage in collecting statistics. As the coefficient of a1 becomes greater, the width of the adaptive zone widens and the slope becomes flatter. As the coefficient b1 increases, the adaptive zone begins at a higher skewness value.

Another factor to consider when determining sampling percentages is the size of the table being scanned. Small tables are relatively low in cost to scan and small sampling errors in small tables may result in more serious impacts than such an error on a large database table. Thus, risking inaccuracy of sampled statistics on a small table is low in benefit compared to cost of scanning. With such considerations, more rows and all rows for a relatively small table may be read as compared to relatively large tables. Even though statistics may only be collected on values of a target column, the overall size of the associated table is still relevant because the physical data structure may be retrieved in order to read an entire column.

In one example, the size of a database table may be defined as:

$$\text{tablesize} = \text{Number of Data Blocks} \quad \text{Eqn. 4}$$

Figure 5:
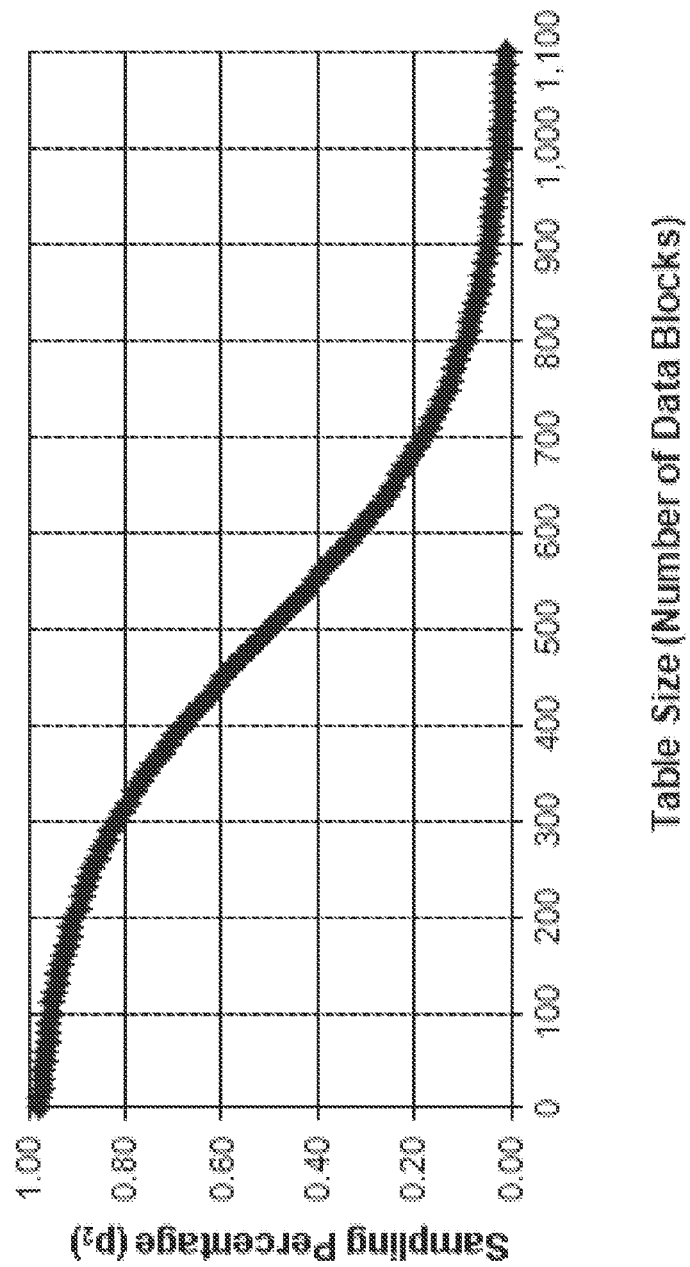
FIG. 5 is a plot of sampling percentage versus database table size.

The sampling percentage $p_2$ may be defined as:

$$p_2 = \frac{1}{1 + e^{a2 \cdot tablesize + b2}} \quad \text{Eqn. 5}$$

where a2 and b2 are coefficients. In one example, the sampling percentage $p_2$ may satisfy two properties. The first is that $p_2$ be greater than 0 and less than 1. The second is that the larger the tablesize becomes, the smaller $p_2$ should become. To satisfy the second property, the coefficient b2 should be a negative number. FIG. 5 is a plot of sampling percentage versus tablesize where the coefficient a2 is 0.0075 and b2 is −3.75. Similar to FIG. 4, there is an aggressive, adaptive, and conservative zone. As the coefficient a2 increases, that adaptive zone may become narrower. As the coefficient b2 increases, the adaptive zone begins earlier.

Another way to estimate statistics on a database table is through reliable trends. Trends may be found through analysis of historical estimation of statistics on a database table stored in the database dictionary module 122. If trends for statistics are considered reliable, the sampling-based estimation may be unnecessary. In one example, the reliability may be quantified to a reliability value and compared to a predetermined reliability threshold value. The sampling percentage $p_3$ may be defined as:

$$p_3 = \begin{cases} 0 & \text{(reliabile trends exist)} \\ 1 & \text{(reliable trends do not exist)} \end{cases} \quad \text{Eqn. 6}$$

Thus, returning to Eqn. 1, if the reliability value is less than the reliability threshold value, $p_3$ is 1. Thus, the sampling probability will in most cases be the maximum of $p_1$ and $p_2$. If the reliability threshold is greater than the reliability threshold value, then $p_3$ is zero, which is the value of sampling percentage p in Eqn. 1. A value of zero for p indicates no sampling is to occur, since the reliability trends may be sufficient to use instead.

Figure 6:
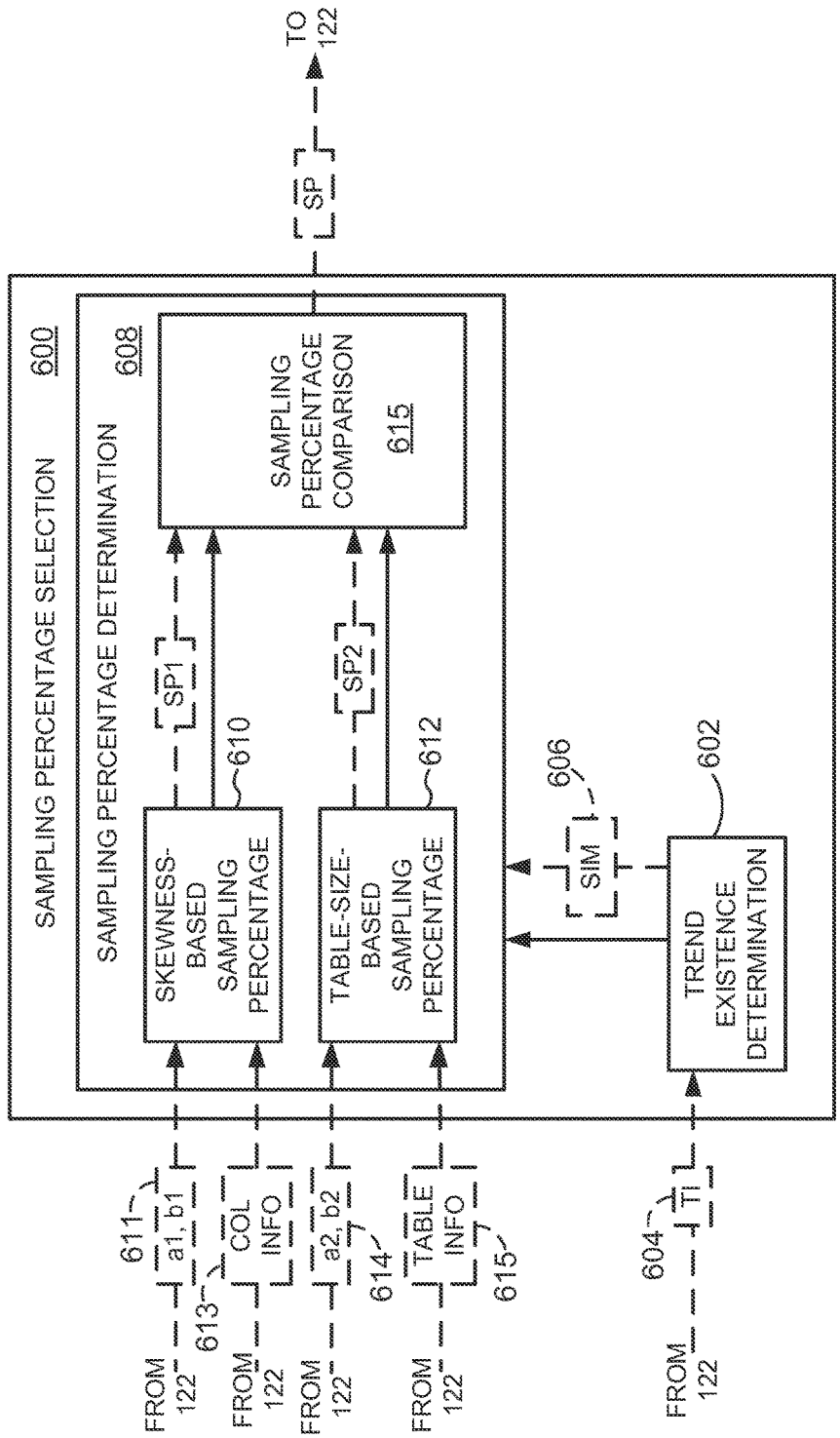
FIG. 6 is a block diagram of example operation of the database system of FIG. 1 during sampling percentage determination.

FIG. 6 is a block diagram of a sampling percentage selection module 600. In one example, the sampling percentage selection module 600 may be executed by one or more of the access modules 110. The sampling percentage selection module 600 may determine if a column or columns should be sampled, and if so, determine a sampling percentage to be used in collecting statistics on the column(s). The collected statistics may be used by the optimizer module 120 in responding to a database query.

The sampling percentage module 600 may be initiated in order to set statistics collection parameters. The initiation, as well as the actual statistics collections, may occur a predetermined times, such as expected off-peak times of the database system 100 at which database system resources would be relatively low. In one example, the sampling percentage determination module 600 may determine if a candidate column to be sampled contains reliable trend information. The sampling percentage determination module 602 may include a trend existence determination module 602. The trend existence determination module 602 may determine if trend information regarding the candidate column exists, and if so, is it reliable enough to use instead of sampling the candidate column. In one example, the trend existence determination module 602 may access the data dictionary to determine if trend information (TI) 604 exists. If so, the trend existence determination module 602 may perform an analysis of the trend information 604 to determine its reliability. If the trend information 604 is reliable, it may be used instead of sampling candidate column. An indication that the trend information is to be used may be maintained in the data dictionary module 122. If the trend information 604 is deemed unreliable or does not exist, the trend existence determination 602 may provide a sampling initiation message (SIM) 606 to a sampling percentage determination module 608. The message 606 may indicate that sampling of the candidate column is to be performed. The sampling percentage determination module 608 may initiate a skewness-based sampling percentage module 610 and a table-size-based sampling percentage module 612.

The skewness-based sampling percentage module 610 may determine a sampling percentage SP1 based on the skewness of the candidate column. In one example, the sampling percentage SP1 may be based on Eqns. 2 and 3. The skewness-based sampling percentage module may retrieve the coefficients 611, a1 and b1, from the data dictionary module 122. The coefficients 613 may be adjustable and may be predetermined or selected at the time of use. The skewness of Eqn. 2 may be based on the candidate column info (COL INFO) 613 received from the data dictionary module 122. The column info 613 may include column statistics such as values for the HMF and RPV. If relevant statistics are not available to the skewness-based sampling percentage module 610, then SP1 may be set at 100%.

The sampling percentage selection module 600 may also include the table-size-based sampling percentage module 612. The table-size-based sampling percentage module 612 may determine a sampling percentage of a database table column based on the size of the database table of the column. In one example, a table-size-based sampling percentage SP2 may be $p_2$, which is based on Eqns. 4 and 5. The skewness-based sampling percentage module 612 may retrieve the coefficients 614, a2 and b2, from the data dictionary module 122 and may receive table information (TABLE INFO) 615 from the data dictionary module 122 or may be determined using dynamic sampling. The table information 615 provides information regarding the size of the database table of the candidate column, such as described in Eqn. 4. The coefficients may be adjustable and may be predetermined or selected at the time of use.

The sampling percentages SP1 and SP2 may be received by a sampling percentage comparison module 616 of the sampling percentage determination module 600. In one example, may select the maximum of the sampling percentages SP1 and SP2. The selected sampling percentage SP may be stored in the data dictionary 122 in order to be used on the candidate column during statistics collection.

FIG. 7 is an operational flow diagram of operation of the database system during determination of a sampling percentage to be used for gathering statistics on a selected column involved in generating a plan to respond to a database query. In one example, sampling percentage determination may be initiated (700). The initiation may be may occur at routine or dynamically selected times, either automatically or via user-based command. Once the sampling percentage selection is initiated, the database system 100 may determine if trend information exists on the column (702). If so, the trend information may be analyzed for reliability (704). If the trend information is reliable, indication that the trend information is to be used for statistics collection may be made (706). If no trend information exists for the candidate column or the trend information is unreliable, the skewness of the candidate column may be determined (708). In one example, this may be performed according to Eqn. 2. The coefficients used to determine a skewness-based sampling percentage may be retrieved (710). The database system 100 may determine if a change in coefficient values is required via user-based input or if a system update has been performed (712). If new coefficients are to be used, the may be received (714). If no changes in the coefficients are made or after the changes, a skewness-based sampling percentage may be determined (716). In one example, the skewness-based sampling percentage may be determined according to Eqn. 3.

Upon determination of the skewness-based sampling percentage, the database system 100 may determine the table size of the database table of the candidate column (717). In one example, the table size may be determined by the number of blocks of data of a predetermined size making up the database table. The database system 100 may retrieve the coefficients for a table-size-based sampling percentage (718), such as those in Eqn. 5. Upon retrieval of the coefficients, the database system 100 may determine if a change in coefficient values is required via user-based input or if a system update has been performed (720). If new coefficients are to be used, they may be received (722). If no changes in the coefficients are made or after the changes, a table-size-based sampling percentage may be determined (724). In one example, the database system 100 may then select the greater of the two sampling percentages (726). The selected sampling percentage may then be stored for subsequent statistics processing on the candidate column (728).

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A database system comprising:
a storage device configured to store a plurality of database tables;
a processor in communication with the storage device, the processor configured to:
determine a first sampling percentage value of a column of a database table from the plurality of database tables based on a respective frequency of each column value in the column, wherein the first sampling percentage value is a first percentage of the column;
determine a second sampling percentage value of the column based on size of the database table, wherein the second sampling percentage value is a second percentage of the column;
compare the first sampling percentage value to the second sampling percentage value; and
in response to the comparison, select one of the first sampling percentage value and the second sampling percentage value, wherein the selected sampling percentage value is a percentage of the column to be used to collect statistics on the column, and wherein collected statistics based on the selected sampling percentage value are used to generate at least one database query response plan associated with the column.

2. The database system of claim 1, wherein the selected sampling percentage value is a greater of the first sampling percentage value and the second sampling percentage value.

3. The database system of claim 1, wherein the first sampling percentage value is based on a ratio of a column value having a highest frequency in the column to an average row per column value of the column.

4. The database system of claim 3, wherein the first sampling percentage value may be expressed as:

$$p_1 = \frac{1}{1 + e^{a1 \cdot s + b1}}$$

where $p_1$ is the first sampling percentage value, a1 is a first predetermined coefficient and b1 is a second predetermined coefficient, and s is the ratio of a column value having a highest frequency in the column to an average row per column value of the column.

5. The database system of claim 1, wherein the second sampling percentage value is based on a number of data blocks of the database table, wherein each data block has a common predetermined size.

6. The database system of claim 5, wherein the second sampling percentage value may be expressed as:

$$p_2 = \frac{1}{1 + e^{a2 \cdot t + b2}}$$

where $p_2$ is the second sampling percentage value, a2 is a first predetermined coefficient, b2 is a second predetermined coefficient, and t is the number of data blocks of the database table.

7. The database system of claim 1, wherein the processor is further configured to:
determine presence of a trend profile of the column;
determine a level of reliability associated with the trend profile; and
based on the determined level of reliability, select the trend profile to be used in generation of the at least one database query response plan associated with the column determine database query response plans associated with the column.

8. A method comprising:
determining, with the processor, a first sampling percentage value of a column of a database table based on at least one characteristic of the column, wherein the first sampling percentage value is a first percentage of the column;
determining, with the processor, a second sampling percentage value of the column based on at least one characteristic of the database table, wherein the second sampling percentage value is a second percentage of the column;
comparing, with the processor, the first sampling percentage value to the second sampling percentage value; and
in response to the comparison, selecting, with the processor, one of the first sampling percentage and the second sampling percentage value, wherein the selected sampling percentage value is a percentage of the column to be used to collect statistics on the column, and wherein collected statistics based on the selected sampling percentage value are used to generate at least one database query response plan associated with the column.

9. The method of claim 8, wherein the selecting, with the processor, one of the first sampling percentage value and the second sampling percentage value comprises selecting, with the processor, a greater of the first sampling percentage value and the second sampling percentage value.

10. The method of claim 8, wherein determining, with the processor, the first sampling percentage value comprises determining, with the processor, the first sampling percentage value based on a ratio of a column value having a highest frequency in the column to an average row per column value of the column.

11. The method of claim 10, wherein determining, with the processor, the first sampling percentage value comprises determining, with the processor, the first sampling percentage value according to the equation:

$$p_1 = \frac{1}{1 + e^{a1 \cdot s + b1}}$$

where $p_1$ is the first sampling percentage value, a1 is a first predetermined coefficient and b1 is a second predetermined coefficient, and s is the ratio of a column value having a highest frequency in the column to an average row per column value of the column.

12. The method of claim 8, wherein determining, with the processor, the second sampling percentage value comprises determining, with the processor, the second sampling percentage value based on a number of data blocks of the database table, wherein each data block has a common predetermined size.

13. The method of claim 12, wherein determining, with the processor, the second sampling percentage value comprises determining, with the processor, the second sampling percentage value according to the equation:

$$p_2 = \frac{1}{1 + e^{a2 \cdot t + b2}}$$

where $p_2$ is the second sampling percentage value, a2 is a first predetermined coefficient, b2 is a second predetermined coefficient, and t is the number of data blocks of the database table.

14. The method of claim 8 further comprising:
determining, with a processor, presence of a trend profile of the column;
determining, with the processor, a level of reliability associated with the trend profile; and
based on the determined level of reliability, selecting, with the processor, the trend profile to be used in generation of the at least one database query response plan associated with the column.

15. A non-transitory computer-readable medium encoded with a plurality of instructions executable by a processor, the plurality of instructions comprising:
instructions to determine a first sampling percentage value of a column of a database table based on at least one characteristic of the column, wherein the first sampling percentage value is a first percentage of the column;
instructions to determine a second sampling percentage value of the column based on at least one characteristic of the database table, wherein the second sampling percentage value is a second percentage of the column;
instructions to compare the first sampling percentage value to the second sampling percentage value; and
instructions to, in response to the comparison, select one of the first sampling percentage value and the second sampling percentage value, wherein the selected sampling percentage value is a percentage of the column to be used to collect statistics on the column, and wherein collected statistics based on the selected sampling percentage value are used to generate at least one database query response plan associated with the column.

16. The non-transitory computer-readable medium of claim 15, wherein the instructions to select one of the first sampling percentage value and the second sampling percentage value comprise instructions to select a greater of the first sampling percentage value and the second sampling percentage value.

17. The non-transitory computer-readable medium of claim 15, wherein the instructions to determine the first sampling percentage value comprise instructions to determine the first sampling percentage value based on a ratio of a column value having a highest frequency in the column to an average row per column value of the column.

18. The non-transitory computer-readable medium of 17, wherein the instructions to determine the first sampling percentage value comprise instructions to determine the first sampling percentage value according to the equation:

$$p_1 = \frac{1}{1 + e^{a1 \cdot s + b1}}$$

where $p_1$ is the first sampling percentage value, a1 is a first predetermined coefficient and b1 is a second predetermined coefficient, and s is the ratio of a column value having a highest frequency in the column to an average row per column value of the column.

19. The non-transitory computer-readable medium of claim 15, wherein the instructions to determine the second sampling percentage value comprise instructions to determine the second sampling percentage value based on a number of data blocks of the database table, wherein each data block has a common predetermined size.

20. The non-transitory computer-readable medium of claim 19 wherein the instructions to determine the second sampling percentage value comprise instructions to determine the second sampling percentage value according to the equation:

$$p_2 = \frac{1}{1 + e^{a2 \cdot t + b2}}$$

where $p_2$ is the second sampling percentage value, a2 is a first predetermined coefficient, b2 is a second predetermined coefficient, and t is the number of data blocks of the database table.

\* \* \* \* \*